United States Patent [19]

Horikawa et al.

[11] Patent Number: 4,943,869
[45] Date of Patent: Jul. 24, 1990

[54] COMPRESSION METHOD FOR DOT IMAGE DATA

[75] Inventors: Hiroshi Horikawa; Hitoshi Urabe; Katsutoshi Yako, all of Kaisei, Japan

[73] Assignee: Fuji Photo Film Co., Ltd., Kanagawa, Japan

[21] Appl. No.: 190,189

[22] Filed: May 4, 1988

[30] Foreign Application Priority Data

May 6, 1987 [JP] Japan .................. 62-110331
May 6, 1987 [JP] Japan .................. 62-110332

[51] Int. Cl.$^5$ .............................. H04N 1/41
[52] U.S. Cl. .................... 358/426; 358/432; 358/262.1
[58] Field of Search ........... 358/432, 426, 427, 261.1, 358/261.2, 261.3, 261.4, 262.1; 341/63, 87, 95

[56] References Cited

U.S. PATENT DOCUMENTS 4,115,815 9/1978 Nakagome et al. ............ 341/63

Primary Examiner—Edward L. Coles, Sr.
Assistant Examiner—Jerome Grant, II
Attorney, Agent, or Firm—Sughrue, Mion, Zinn, Macpeak & Seas

[57] ABSTRACT

This invention method performs data compression for dot image data by utilizing the redundancy based on spacial correlation of images and correlation of dot patterns. More particularly, a threshold matrix is rearranged in array according to a predetermined reference, the threshold matrix being used to convert input image data into dot data, so as to output the same logical values continuously from the top and/or from the end of dot data array, and simultaneously dot data are grouped in the unit of a predetermined bits so as to count the number of units having the same and continuous logical values from the top and/or from the end to thereby effectively compress data of dot images by a perfect reproduction system or a non-perfect reproduction system.

14 Claims, 5 Drawing Sheets

FIG. 3

| CODE FOR ENCODING (5 BITS) | BIT PATTERN OF CODE TABLE 0 | BIT PATTERN OF CODE TABLE 1 | BIT PATTERN OF CODE TABLE 2 | BIT PATTERN OF CODE TABLE 3 |
|---|---|---|---|---|
| 00000 | 00000000 | 00000000 | 00000000 | 00000000 |
| 00001 | 00000001 | 00000001 | 00000001 | 00000001 |
| 00010 | 00000011 | 00000011 | 00000011 | 00000011 |
| 00011 | 00000111 | 00000111 | 00000111 | 00000111 |
| 00100 | 00001111 | 00001111 | 00001111 | 00001111 |
| 00101 | 00010000 | 00010000 | 00010000 | 00010000 |
| 00110 | 00010001 | 00010001 | 00010001 | 00010001 |
| 00111 | 00010011 | 00010011 | 00010011 | 00010011 |
| 01000 | 00010111 | 00010111 | 00010111 | 00010111 |
| 01001 | 00011111 | 00011111 | 00011111 | 00011111 |
| 01010 | 00110000 | 00110000 | 00110000 | 00110000 |
| 01011 | 00110001 | 00110001 | 00110001 | 00110001 |
| 01100 | 00110011 | 00110011 | 00110011 | 00110011 |
| 01101 | 00110111 | 00110111 | 00110111 | 00110111 |
| 01110 | 00111111 | 00111111 | 00111111 | 00111111 |
| 01111 | 01110000 | 01110000 | 01110000 | 01110000 |
| 10000 | 01110001 | 01110001 | 01110001 | 01110001 |
| 10001 | 01110011 | 01110011 | 01110011 | 01110011 |
| 10010 | 01110111 | 01110111 | 01110111 | 01110111 |
| 10011 | 01111111 | 01111111 | 01111111 | 01111111 |
| 10100 | 11110000 | 11110000 | 11110000 | 11110000 |
| 10101 | 11110001 | 11110001 | 11110001 | 11110001 |
| 10110 | 11110011 | 11110011 | 11110011 | 11110011 |
| 10111 | 11110111 | 11110111 | 11110111 | 11110111 |
| 11000 | 11111111 | 11111111 | 11111111 | 11111111 |

F I G. 7

| CODE FOR ENCODING (5 BITS) | BIT PATTERN OF CODE TABLE 0 | BIT PATTERN OF CODE TABLE 1 | BIT PATTERN OF CODE TABLE 2 | BIT PATTERN OF CODE TABLE 3 |
|---|---|---|---|---|
| 11001 | Not Used | Not Used | 000000000000000 | 000000000000000 |
| 11010 | Not Used | Not Used | 001100110011001 | 001100110011001 |
| 11011 | Not Used | Not Used | 111111111111111 | 111111111111111 |
| 11100 111 WHEN INDICATE "End" | Not Used | End B SECTION BECOMES TO 3 BITS | End B SECTION BECOMES TO 3 BITS | 000011110000111 |
| 11101 111 WHEN INDICATE "End" | Not Used | End B SECTION BECOMES TO 3 BITS | End B SECTION BECOMES TO 3 BITS | 000100010001000 |
| 11110 111 WHEN INDICATE "End" | Not Used | End B SECTION BECOMES TO 3 BITS | End B SECTION BECOMES TO 3 BITS | 011101110111011 |
| 11111 111 WHEN INDICATE "End" | Not Used | End B SECTION BECOMES TO 3 BITS | End B SECTION BECOMES TO 3 BITS | 111100001111000 |

FIG. 8

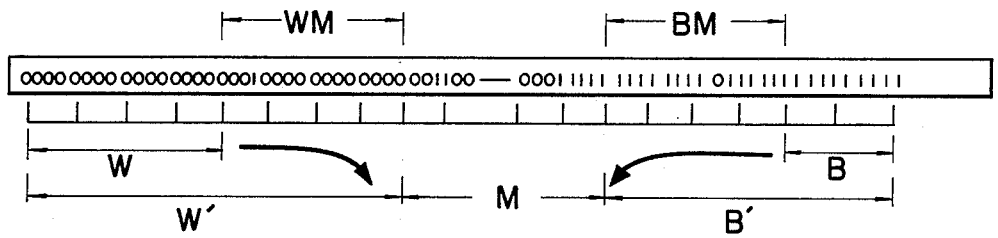

FIG. 9

COMPRESSION METHOD FOR DOT IMAGE DATA

BACKGROUND OF THE INVENTION

This invention relates to data compression method of a perfect or partial reproduction type which can effective compress dot image data.

The compression technology for pseudo-halftone images which represent half tones with binary data is widely used for transmitting data such as half tone image or newspaper iamges by a facsimile. This is because they cannot be directly transmitted or stored in a memory effectively as the volume of image data is extremely large. In data transmission by the facsimile, data compression technology has been used to transmit data at a high efficiency by an MH method (one dimensional compression: Modified Huffman Coding) or an MR method (two dimensional compression: Modified-READ) in the prior art. These conventional methods, however, are not appropriate as the technique to compress the dot image data. If they are applied to the pseudo-halftone images, an array of the image data should be re-arrange in the order of the threshold values in a dither matrix to produce longer runs so as to transmit character images more effectively, but it is not easy to select the method to change the data array which reduces the number of small runs of about one to three bits.

There has been proposed a prediction encoding method which considered not only the state of leading reference pixels of m number but the position of the current pixel within the dither matrix. The method is also defective in that it is difficult to implement as a practical device if the number m of states is to be increased. Even if the aforementioned conventional MH method or MR method is applied as it is, the compression rate is low.

SUMMARY OF THE INVENTION

This invention was conceived to improve the aforementioned defective prior art and aims at providing a compression method for dot images data of a perfect or a non-perfect (partial) reproduction which can compress and transmit the dot image data at a high efficiency and speed.

According to one aspect of this invention, for achieving the objects described above, there is provided a compression method for dot image data of type where image signals are referred to threshold values of n number (n is an integer of 3 or more) per pixel, and digital dot data are produced in n bits of per pixel, which is characterized in that a unit of an encoding scope, i.e., a predetermined block size of image data used for the compression is a product of the dot scope multiplied with an integer, said digital dot data are re-arranged in the unit of said pixel in accordance with a predetermined reference obtained from a threshold matrix of the respective pixels, data having the same continuous logical values from a top and/or an end of the dot data thus obtained are counted in a predetermined unit so as to display number of units from the top and/or the end thereof, and data other than the above are used as they are.

According to another aspect of this invention, there is provided a compression method for dot image data of the type where image signals are referred to threshold values of n number (n is an integer of 3 or more) per pixel, and digital dot data are produced in n bits per pixel, which is characterized in that a unit of an encoding scope for the compression is a product of the dot scope multiplied with an integer, said digital dot data are re-arranged in the unit of said pixel in accordance with a predetermined reference obtained from a threshold matrix of the respective pixels, data of the threshold matrix within said pixel are re-arranged in a predetermined order, dot data in a bit unit obtained by said re-arrangements are grouped in a product unit of n multiplied with an integer, two groups of said. Product unit having the same logical values are counted from a top and/or an end of the dot data in said bit unit, intermediate section data between the two groups are compressed in accordance with a code table, and compressed data are used as the dot data.

Further, according to still another aspect of this invention there is provided a compression method for dot image data of the type where image signals are referred to threshold values of n number (n is an integer of 3 or more) per pixel, and digital dot data are produced in n bits per pixel, which is characterized in that a unit of an encoding scope for compression is a product of a dot scope multiplied with an integer, said digital dot data are re-arranged in the unit of said pixel in accordance with a predetermined reference obtained from a threshold matrix of the respective pixels, data having the same continuous logical values are counted from a top and/or an end of thus obtained dot data to be used as the number counted in a predetermined unit, and data within a predetermined scope from both end sides of intermediate section data in a scope which has been counted are treated as the same logical values in counting. More particularly, there is a compressing of the digital dot data by counting data in predetermined units having the same continuous logical values (i.e., "1"s or "0"s), from at least one of a top and an end of the dot data thus obtained, so as to produce compression data corresponding to a number of units from the at least one of a top and end thereof.

Still further, according to another aspect of this invention, there is provided a compression method for dot image data of the type where image signals are referred to threshold values of n number (n is an integer of 3 or more) per pixel, and digital dot data are produced in n bits per pixel, which is characterized in that a unit of an encoding scope for the compression is a product of the dot scope multiplied with an integer, said digital dot data are re-arranged in the unit of said pixel in accordance with a predetermined reference obtained from a threshold matrix of the respective pixels, data of the threshold matrix within said pixel are rearranged in a predetermined order, dot data in a bit unit obtained by said re-arrangements are grouped in a product unit of the n multiplied with an integer, two groups having the same continuous logical values are counted from a top and/or an end of the dot data in said bit unit, and the number of units is counted, data in an intermediate section between said two groups are compressed in accordance with a code table, and data within a predetermined scope from both end sides of the compressed data are regarded to have the same values, and additionally counted.

BRIEF DESCRIPTION OF THE DRAWINGS

In the accompanhing drawings:

FIG. 3 is a chart to show an embodiment of the dot data according to this invention;

FIG. 7 is a code table for the data compression which is to be used in this invention method;

FIG. 8 is an extended code table; and

FIG. 9 is another chart to explain this invention method.

DESCRIPTION OF THE PREFERRED EMBODIMENTS

The inventive method comprises a step of re-arranging a threshold matrix which converts input image data into dot data in advance in accordance with a predetermined reference so as to continuously output logical values of "1" or "0" from the top and/or the end of a dot data string. This inventive method comprises a step of grouping dot data in units of a predetermined number of bits so as to count the units having the same logical values continuously from the top and/or the end to achieve data compaction at a high efficiency. Moreover, the dot data at an intermediate portion of the data string are shortened in accordance with a code table for further compression by re-arranging the threshold matrix which has been grouped in the unit of bits according to a predetermined order. The ratio of compression is further improved by additionally counting data within a predetermined range from both end sides of the intermediate section of the dot data string which are regarded as the data with the same logical value. In short, this inventive method achieves effective compression of dot image data resulting in a perfect or a non-perfect reproduction by utilizing the redundancy based on the spatial correlation of images and the correlation of dot patterns.

Figure 1:
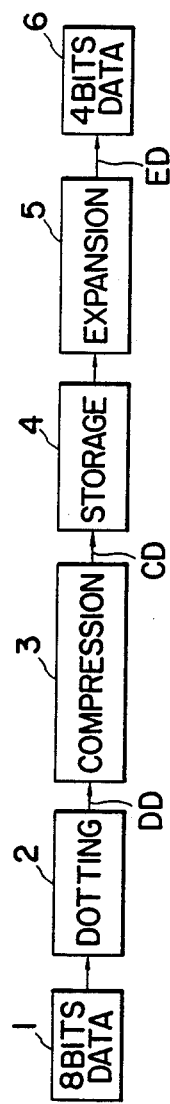
FIG. 1 is a block diagram to show this invention method in order of data flow.

FIG. 1 shows the outline of this inventive method in accordance with the data flow wherein image data (1) represented by 8 bits are converted (2) into dot data DD with a threshold matrix (a dither matrix), the dot data DD are compressed (3), stored (4) in a memory and then extended or expanded (5) into dot data (6) of 4 bits. In a preferred embodiment, a perfect reproduction system is accomplished wherein the dot data DD and the extended data ED are perfectly identical.

Figure 2:
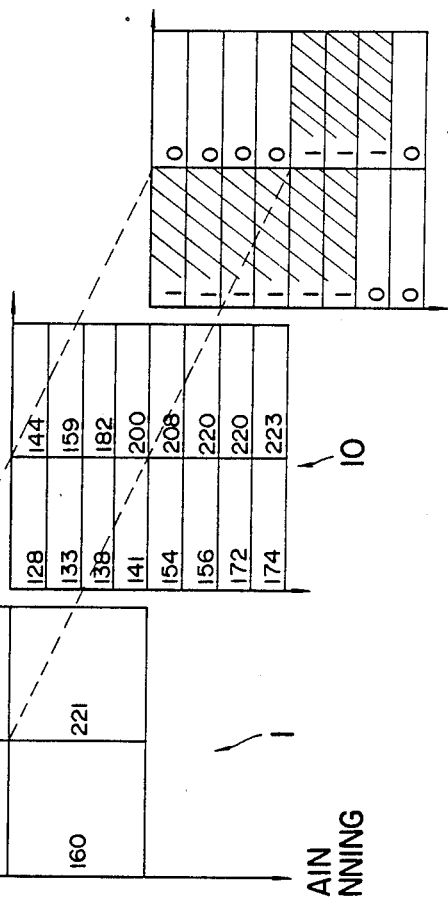
FIG. 2 is a chart to show the relation between input image data and dot data according to this invention.

FIG. 2 shows the state for forming the dot data DD with input image data 1 and a threshold matrix 10. As obvious from FIG. 2, input image data 1 comprised of a plurality of pixel density levels, each corresponding to a density level of a different pixel and having a density level of "0" to "255" (8 bits) are referred to the four (4) threshold values per one pixel so as to form the dot data DD in the rate of 4 bits per one pixel. In this reference, wherever the density level of a pixel in the input image data 1 is higher than a threshold value it is coded as "1" (black), and when it is lower than a threshold value, it is coded as "0" (white). The four (4) threshold values of each bit pixel in the threshold matrix 10 are dependent only on the coordinates of pixels irrespective of the levels thereof.

Figure 3:
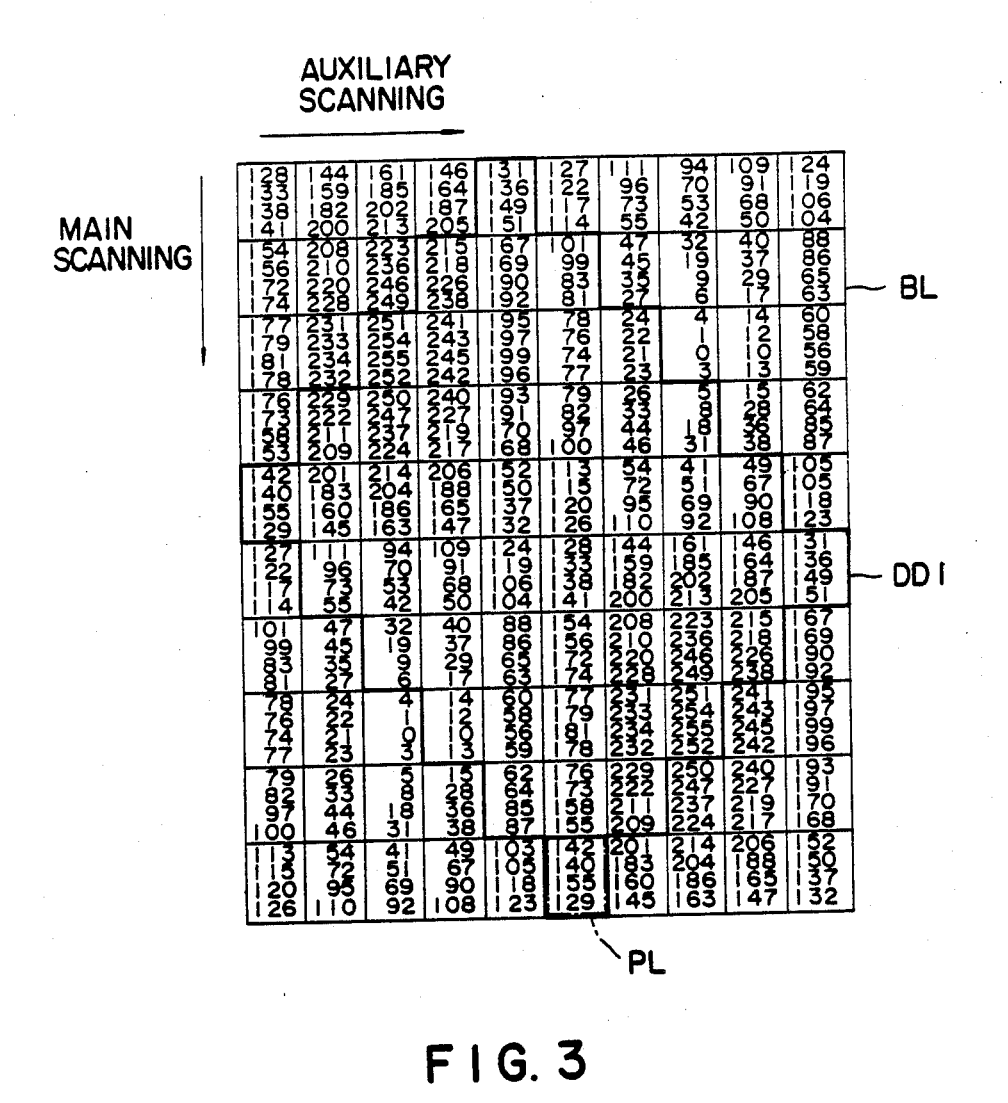
Figure 4:
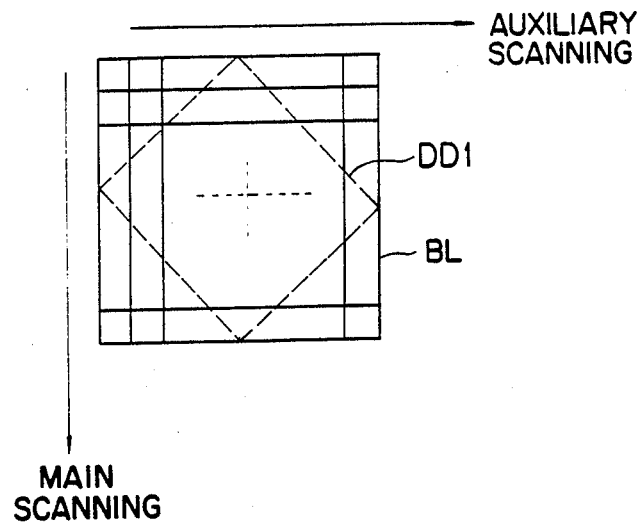
FIGS. 4 through 6 are charts to explain this invention method.
Figure 5:
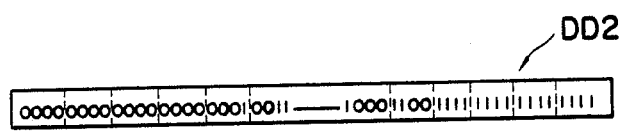
Figure 6:
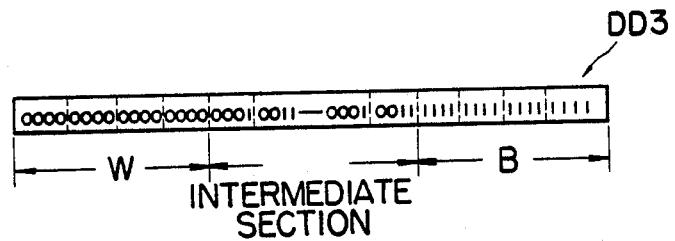

As shown in the exemplary threshold matrix in FIG. 3, the encoding method is employed according to the size of a block BL which is two times the size of the dot data DD1 or two dot units, and each one pixel being associated with 4 threshold valves expressed block PL. Since the size of the block BL in encoding is two dot units, images comprise 100 pixels per block. As shown in FIG. 4, the image data 1 are converted into binary codes using the threshold matrix 10 for each block and pixel dot data groups (of 4 bits) in the block BL which have been converted to the dots are re-arranged according to the mean value of threshold values of the 4 threshold valves per pixel in the threshold matrix 10 so as to obtain dot data DD2 as shown in FIG. 5. Then, image dot data (4 bits) which have been converted into dots in the block BL are re-arranged within each four bit group in the order from the largest of 4 threshold values for each pixel of the threshold matrix 10. Accordingly, the re-arrangement of data is performed in a fixed order determined by the threshold matrix 10. In other words, since the threshold value for each bit in the threshold matrix 10 is fixed as shown in FIG. 2, the pixel data are re-arranged in the order of the magnitude of threshold values (from the larges or the smallest), and at the same time, bit data for each pixel are re-arranged so that all the image data are re-arranged in the order of threshold values (from the largest or the smallest) as shown in FIG. 6.

The re-arranged dot data DD3 of 400 bits are then encoded for each unit of 8 bits. The dot data DD3 of 400 bits are scanned in predetermined consecutive groups or units of 8 bits so as to obtain the unit number of 8-bit units "0" bits continuously. This group is called a white section W, and since the length of the white section W can be from "0" to "50" 8-bit units, it can be encoded with 6 bits. Then the re-arranged dot data DD3 of 400 bits are scanned from an opposite end in the unit of 8 bits to obtain the unit number of 8 bit units having "1" bits continuously. This group is called a black section B, and since the length thereof also can be from "0" to "50" 8-bit units, it can be encoded with 6 bits. It should be remembered in the above example that direction is arbitrary and when the steps are performed in an opposite manner or the positions of the sectons B and W are changed, the result is the same.

The data in a section interposed between the white section W and the black section B are called intermediate section data or are called as intermediate data. The intermediate data are limited to have only 25 patterns as shown in the code table 0–3 in FIG. 7, i.e. limited to 25 patterns as the result of the above rearrangement in terms of 8 bits. All of the patterns can be encoded fixedly with a 5-bit code for encoding. In short, the intermediate section data of 8 bits can be compressed into the data of 5 bits. Generally, if the encoding is performed in the unit of $(l \times n)$ bits wherein l is an integer, the number of pattern is expressed $(n+1)^l$ which can be substituted with X bit(s) having a relation of $2^{X-1} < (n+1)^l \leq 2^X$.

More effective data compression can be achieved if the method (in other words, the white section W and the black section B are encoded with 6 bits) is combined with a method which represents the white section W and the black section B of the dot data DD3 of 400 bits which have been re-arranged in terms of the number of units. When the method were applied to actual image data, the compression, ratio of ca. 1/7.5 was achieved.

In encoding of the intermediate section, in the cases of code tables 1–3 shown in FIG. 7, the compression ratio can be enhanced by allocating the data as shown in FIG. 8 to "11001, 11010, 11011, 11100, 11101, 11110, 11111". That is, when $2^X - (N+1)^l \neq 0$, codes of $(2^X-(n+1)^l)$ types can be allocated as the specific patterns of the intermediate section or the codes in the black section B. When applied to a practical image data, the compression ratio of ca. 1/8.6 was achieved.

In a partial reproduction system where the dot data DD are not identical to the extended or expanded data ED in FIG. 1, the procedure will be as below.

The white section W and the black section B are extended or expanded by ignoring random indispersed bits of an opposite logical value and treating the data within a predetermined range (e.g. data of 16 bits) from both end sides of the intermediate data as having an identical logical value. FIG. 9 shows such a state where the data WM of 16 bits from an end side of the intermediate section data for the white section B are treated as the white or "0" even if a random, singular "1" bit is included in them. In other words, the white section W is apparently extended into a white section W'. Similarly, the data BM of 16 bits from an end side of the intermediate section data for the black section B are treated as "1" even if a random, singular bit "0" is included in them. In short, the black section B is apparently extended into a black section B'. If the discrepancies within extended sections W' and B' are disregarded or ignored, compressed dot data M will be obtained. Since a part of re-arranged dot data is forcbily inverted in data compression, they cannot be reproduced perfectly when extended or expanded. However, the efficiency in data compaction has increased. In the case shown in FIG. 9, a section of 16 bits is extended from either the end of the white section W or the black section B to be treated as a section having bits of logical value. However, the data compression may be achieved by treating all the scope from an end of the white section W to the position where "1" appears in 2 consecutive bits as opposed to the state "0" and treating all the scope from an end of the black section B to the position where "0" appears in 2 consecutive bits as opposed to the state "1". When practical image data were compressed with this method, and the bit number for inversion was set at 2 consecutive bits for treating a scope from the both end sides of the intermediate section data, about a 1/9.4 compression ratio was achieved. Likewise, with the inversion bit number set at 4, a compression ratio of ca. 1/10.3, and with the number set at 8, the ratio of ca. 1/10.8 were attained.

Although pixel data (of 4 bits) in a block BL which have been converted to dots are re-arranged with a mean value of threshold values of 4 bits per pixel in the threshold matrix 10 in aforementioned preferred embodiment, they may be re-arranged in the order of threshold values of 4 bits from the larges or the smallest, i.e., a method wherein the predetermined reference is a maximum value of the n threshold matrix values of the respective pixels of a threshold matrix, or wherein the predetermined reference is a minimum value of the n threshold matrix values of the respective pixels of the threshold matrix. Moreover, when the threshold value of the threshold matrix 10 is higher than "128" (intermediate value), the pixel data (4 bits) in dots in the block are re-arranged in the order of the maximum value of the threshold of each pixel in the threshold matrix 10. When it is "127" or less, they are re-arranged in the order of the minimum value of the threshold of 4 bits, i.e., a method wherein the predetermined reference is in the order of a maximum value of the n threshold matrix values when a mean value of the n threshold matrix values of ech pixel is greater than a reference value, and is in the order of a minimum value of the n threshold matrix values when the mean value is smaller than the reference value. Although the block is explained as being 2 dot units in size in the above embodiments, the processing can be performed for any arbitrary dot units. Further, the data compression for intermediate section need not necessarily be performed. The above mentioned data of "1" and of "0" may be converts, and logical conversion between "1" and "0" may be performed in an arbitrary manner for threshold positions.

As described in the foregoing statement, this invention data compression method is capable of realizing compression at a high speed and at a high efficiency as the method can be implemented by encoding simply with such hardware as address or data conversion and comparators.

It should be understood that many modifications and adaptations of the invention will become apparent to those skilled in the art and it is intended to encompass such obvious modifications and changes in the scope of the claims appended hereto.

What is claimed is:

1. A compression method for dot image data of the type wherein an image signal is comprised of a plurality of pixel density levels, each corresponding to a density level of a different pixel, said method comprising the steps of:

providing a threshold matrix means having n (where n is an integer value) threshold matrix values associated with each pixel, said threshold matrix means for converting said image signal to digital dot data by comparing each said pixel density level to said n threshold matrix values associated with that pixel, to produce, for each pixel, n bits of digital dot data which are re-arranged for each respective said pixel in accordance with a predetermined reference obtained from threshold matrix values of the respective said pixel, compressing said digtial dot data by counting data having the same continuous logical values, from at least one of a top and an end of the dot data thus obtained, in increments of a predetermined unit so as to produce compression data corresponding to a number of units from the at least one of a top and end thereof, and leaving digital dot data which are not compressed in said compressing step in un-encoded form.

2. A compression method for dot image data as claimed in claim 1 wherein said predetermined refernce is a mean value of said n threshold matrix values of the respective pixels of said threshold matrix means.

3. A compression method for dot image data as claimed in claim 1 wherein said predetermined reference is a maximum value of said n threshold matrix values of the respective pixels of said threshold matrix means.

4. A compression method for dot image data as claimed in claim 1 wherein said predetermined reference is a minimum of said n threshold matrix values of the respective pixels of said threshold matrix means.

5. A compression method for dot image data as claimed in claim 1 wherein said predetermined reference is in the order of a maximum value of said n threshold matrix values when a mean value of said n threshold matrix values of each pixel is greater than a reference value, and is in the order of a minimum value of said n threshold matrix values when the mean value is smaller than said reference value.

6. A compression method for dot image data of the type wherein an image signal is comprised of a plurality of pixel density levels, each corresponding to a density level of a different pixel, said method comprising the steps of:

providing a threshold matrix means having n (where n is an integer value) threshold matrix values associated with each pixel, said threshold matrix means for converting said image signal to digital dot data by comparing each said pixel density level to said n threshold matrix values associated with that pixel, to produce, for each pixel, n bits of digital dot data which are re-arranged for each respective said pixel in accordance with a predetermined reference obtained from threshold matrix values of the respective said pixel, wherein different pluralities of said n bits of digital dot data obtained by said rearrangements are each grouped in a product unit of n multiplied with an integer;

compressing said digital dot data by counting the number of groups of said product unit having the same logical values from first and second opposing ends of at least one of an opposing top/bottom and a left/right string of the digital dot data, wherein there are derived first and second group data and there is uncompressed intermediate digital dot data between the groups of said product unit used to obtain said first and second group data; and further compressing said intermediate digital dot data in accordance with a code table.

7. A compression method for dot image data as claimed in claim 6 wherein said code table is a look-up table.

8. A compression method for dot image data of the type wherein an image signal is comprised of a plurality of pixel density levels, each corresponding to a density level of a different pixel, said method comprising the steps of:

providing a threshold matrix means havign n (where n is an integer value) threshold matrix values associated with each pixel, said threshold matrix means for converting said image signal to digital dot data by comparing each said pixel density level to said n threshold matrix values associated with that pixel, to produce, for each pixel, n bits of digital dot data which are re-arranged for each respective said pixel in accordance with a predetermined reference obtained from threshold matrix values of the respective said pixel, compressing said digital dot data by counting data from at least one of a top and an end of thus obtained digital dot data, and continuing said count until at least two bits of data having logical values opposite to those of previous counted bits are encountered, wherein previous counted bits which have been counted are treated as the same logical values.

9. A compression method for dot image as claimed in claim 8 wherein said predetermined reference is a mean value of said n threshold matrix values of the respective pixels of said threshold matrix means.

10. A compression method for dot image data as claimed in claim 8 wherein said predetermined reference is a maximum value of said n threshold matrix values of the respective pixels of said threshold matrix means.

11. A comression method for dot image data as claimed in claim 8 wherein said predetermined reference is a minimum of said n threshold matrix values of the respective pixels of said threshold matrix means.

12. A compression method for dot image data as claimed in claim 8 wherein said predetermined reference is in the order of a maximum value of said n threshold matrix values when a mean value of said n threshold matrix values of each pixel is greater than a reference value, and is in the order of a minimum value of said n threshold matrix values when the mean value is smaller than said reference value.

13. A compression method for dot image data of the type wherein an image signal is comprised of a plurality of pixel density levels, each corresponding to a density level of a different pixel, said method comprising the steps of:

providing a threshold matrix means having n (where n is an integer value) threshold matrix values associated with each pixel, said threshold matrix means for converting said image signal to digital dot data by comparing each said pixel density level to said n threshold matrix values associated with that pixel, to produce, for each pixel, n bits of digital dot data which are re-arranged for each respective said pixel in accordance with a predetermined reference obtained from threshold matrix values of the respective said pixel, compressing said digital dot data by counting the number of data having the same logical values from first and second opposing ends of at least one of a top/bottom and a left/right string of the dot data and continuing count with respect to each of said first and second opposing ends until at least two bits of data having logical values opposite to those of previous counted bits are encountered, wherein previous counted bits which have been counted are treated as the same logical values and there are derived first and second group data and uncompressed intermediate digital dot data between the groups of said product unit used to obtain said first and second group data; and further compressing said intermediate digital dot data in accordance with a code table.

14. A compression method for dot image data as claimed in claim 13 wherein said code table is a look-up table.

* * * * *